(12) United States Patent
Gajiwala

(10) Patent No.: US 7,461,503 B2
(45) Date of Patent: Dec. 9, 2008

(54) LOW-COST, LOW-DENSITY, ABLATIVE RUBBER INSULATION FOR ROCKET MOTORS

(75) Inventor: Himansu M. Gajiwala, Clearfield, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 280 days.

(21) Appl. No.: 10/608,830

(22) Filed: Jun. 26, 2003

(65) Prior Publication Data

US 2004/0209987 A1 Oct. 21, 2004

Related U.S. Application Data

(60) Provisional application No. 60/391,679, filed on Jun. 26, 2002.

(51) Int. Cl.
F02K 9/34 (2006.01)
C09K 21/14 (2006.01)
C08L 27/00 (2006.01)

(52) U.S. Cl. ............... 60/255; 60/255; 60/253; 523/138; 523/179; 524/464; 524/527

(58) Field of Classification Search ......... 523/138, 523/179; 524/464, 527; 60/253, 255
See application file for complete search history.

(56) References Cited

U.S. PATENT DOCUMENTS

| | | | | |
|---|---|---|---|---|
| 4,246,359 A | * | 1/1981 | Whelan | 521/92 |
| 4,501,841 A | * | 2/1985 | Herring | 524/411 |
| 4,649,701 A | | 3/1987 | Wendel | |
| 4,726,987 A | * | 2/1988 | Trask et al. | 442/373 |
| 4,878,431 A | * | 11/1989 | Herring | 102/290 |
| 5,498,649 A | | 3/1996 | Guillot | |
| 5,821,284 A | * | 10/1998 | Graham et al. | 523/179 |
| 5,830,384 A | | 11/1998 | Stephens et al. | |
| 5,952,089 A | * | 9/1999 | Namura et al. | 428/318.4 |
| 6,566,420 B1 | * | 5/2003 | Guillot et al. | 523/138 |
| 2002/0018847 A1 | | 2/2002 | Guillot | |

FOREIGN PATENT DOCUMENTS

| | | |
|---|---|---|
| EP | 1 184 560 A2 | 8/2001 |
| WO | WO 00/43445 | 7/2000 |
| WO | WO 0043445 A2 * | 7/2000 |
| WO | WO 01/04198 A1 | 1/2001 |
| WO | WO 01/20966 A2 | 3/2001 |
| WO | WO 01/46279 A1 | 6/2001 |

OTHER PUBLICATIONS

"Section 1: Chemical Product and Company Identification," Basstech International LLC, 5 pages, Mar. 22, 2001.
"Toughen up with the Best: PPG Reinforcing Silicas for the Rubber Industry," PPG Industries, Silica Products, <<http://www.ppg.com/chm_silicas/toughen.htm>> 3 pages, 2001.
Sld Richardson Carbon Co., Material Safety Data Sheet, "Carbon Black," First Issue: Jun. 17, 1999, Revision date: Nov. 20, 2003.
Univar, Material Safety Data Sheet, LA8260 Corax N330, Jun. 29, 2005, 6 pages, distributed by Stochem Speciality Chemicals a Division of Univar Canada Ltd.

* cited by examiner

Primary Examiner—Vasu Jagannathan
Assistant Examiner—Vickey Ronesi
(74) Attorney, Agent, or Firm—TraskBritt

(57) ABSTRACT

An insulation material comprising a low-density EPDM polymer, at least one flame-retardant, and an organic filler. The insulation material is used in an insulation layer of a rocket motor. The organic filler is a polymeric, organic filler such as polyvinyl chloride. A rocket motor comprising an insulation material is also disclosed. The insulation material comprises a low-density EPDM polymer, at least one flame-retardant, and a polymeric, organic filler and is applied between an inner surface of a case of the rocket motor and a propellant. A method of insulating a rocket motor is also disclosed.

5 Claims, 12 Drawing Sheets

LOW-COST, LOW-DENSITY, ABLATIVE RUBBER INSULATION FOR ROCKET MOTORS

RELATED APPLICATIONS

This application claims the benefit of U.S. Provisional Patent Application Ser. No. 60/391,679, filed Jun. 26, 2002, for LOW COST, LOW-DENSITY, ABLATIVE RUBBER INSULATION FOR ROCKET MOTORS.

BACKGROUND OF THE INVENTION

1. Field of the Invention

The present invention relates to an insulation material for use in rocket motors. More specifically, the invention relates to an ablative, rubber insulation material that comprises a low-density EPDM polymer, at least one flame-retardant, and an organic filler.

2. State of the Art

As illustrated in FIGS. 1A and 1B, a conventional rocket motor 2 comprises a case 4 or shell produced from a rigid, durable material, such as a metal or composite. The case houses a solid propellant grain 6 that combusts to provide the thrust necessary to propel the rocket motor 2. An insulation layer 8 is deposited between the case 4 of the rocket motor 2 and the propellant grain 6 to protect the case 4 from heat and particle streams that are generated during operation of the motor. The insulation layer 8 is comprised of an insulation material that is capable of withstanding high temperatures (approximately 2760° C. or 5000° F.) and high interior pressures (approximately 1500 psi) that are produced upon combustion of the propellant grain 6. If the insulation material is not capable of withstanding these temperatures and pressures, the heat and particle streams erode the insulation layer 8, leaving the case 4 susceptible to melting or degradation, which may ultimately lead to failure of the rocket motor 2.

Rocket motor insulation materials have typically used filled and unfilled rubbers and plastics, such as phenolic resins, epoxy resins, high-temperature melamine-formaldehyde coatings, and polyester resins. In addition, elastomers have been used due to their desirable mechanical, thermal, and ablative properties. For example, ethylene propylene diene monomer ("EPDM") rubbers, also known as EPDM polymers, have been commonly used in insulation materials. However, some elastomers have poor thermal properties and poor mechanical properties, such as elongation capabilities and tensile strength. Therefore, an EPDM polymer is commonly combined with flame-retardants and fillers to improve these properties. The flame-retardants are inorganic or organic compounds. The fillers are typically organic-based or carbon fibers and are used to reinforce the elastomers and to prevent or slow down the decomposition of the insulation material.

Various elastomeric rubber insulation compositions have been disclosed. In WO 00/43445 to Guillot and Harvey, an EPDM rocket motor insulation is disclosed. The rocket motor insulation comprises an EPDM terpolymer with alkylidene norbornene as the diene component. These EPDM terpolymers include NORDEL® IP 4520 and NORDEL® IP 4640, which are available from Dupont Dow Elastomers (Wilmington, Del.). The insulation also comprises DECHLORANE PLUS® 515. The DECHLORANE® series of compounds are chlorinated, cyclic aliphatic hydrocarbons that are commonly used as flame-retardants.

A method of insulating a case of a solid propellant rocket motor is disclosed in WO 01/46279 to Guillot. The application discloses manufacturing an insulation material that comprises a liquid EPDM polymer and carbon fibers. The insulation also comprises an organic flame-retardant filler, such as DECHLORANE®, in combination with antimony oxide or hydrated alumina.

In U.S. Patent Application Publication 2002/0018847 to Guillot, an EPDM rocket motor insulation is disclosed. The insulation comprises an EPDM polymeric matrix dispersed with carbon fibers. The insulation also comprises an inorganic or organic flame-retardant, such as a chlorinated hydrocarbon. In this rocket motor insulation, the organic flame-retardant DECHLORANE® is used in combination with antimony oxide or hydrated alumina.

In U.S. Pat. No. 5,498,649 issued to Guillot, a low-density, elastomeric ablative insulation is disclosed. The insulation comprises a thermoplastic elastomeric polymer resin containing a polyamide polymer and a maleic anhydride modified EPDM polymer. The insulation also comprises chopped fibers that are added to provide charring and ablative insulation performance. The chopped fibers are aramid fibers, such as KEVLAR® fibers, and are approximately ⅛ inch long.

In WO 01/04198 to Harvey et al., a rocket motor insulation that comprises an elastomer-base polymer, such as NORDEL® IP 4640, and hydrophilic silica particles coated with a hydrophobic coating is disclosed. The insulation also comprises an organic flame-retardant, such as DECHLORANE®, in combination with antimony oxide or hydrated alumina.

In U.S. Pat. No. 5,821,284 to Graham et al., a durable motor insulation is disclosed. The insulation comprises EPDM rubber, aramid fibers, and ammonium sulfate in combination with antimony oxide to reduce the ablation rate of the insulation. DECHLORANE PLUS® 515 is also used in the insulation.

An elastomerized phenolic resin ablative insulation for use in rocket motors is disclosed in WO 01/20966 to Metcalf et al. The insulation comprises a vulcanizable rubber, such as butadiene acrylonitrile, and a phenolic resin. The application discloses that antimony oxide and hydrated alumina in combination with chlorinated hydrocarbons may be used as a flame-retardant system.

While many of these patents and applications disclose using DECHLORANE® compounds in the insulation material, the DECHLORANE® compounds are small molecules. The small size of the DECHLORANE® compounds diminishes the desirable characteristics of the rubber to which they are added.

Currently, silica-filled and fiber-filled insulation materials are commonly used in rocket motors. The silica-filled insulation materials have a low density and good mechanical properties while the fiber-filled insulation materials have a high density, poor mechanical properties and a higher cost. However, the silica-filled insulation materials have inferior ablative properties in comparison to the fiber-filled insulation materials. Thus, the fiber-filled insulation materials exhibit better ablative properties but at the detriment of cost, higher density, and inferior mechanical properties.

In addition, depending on the performance requirements of the rocket motor, different insulation materials are used in different locations of the motor due to differing conditions at the various locations inside the motor. The rocket motor typically has three sections (the low-, mid-, and high-sections), depending on the configuration of the motor. The diameter of the motor also varies in these three sections. In the low-section, the motor has a relatively large diameter while in the high-section, the motor has a relatively small diameter. The diameter of the motor at a given location determines the amount of exposure that the insulation material receives. If the diameter is small, that section of the motor will be exposed to more gases and will be more prone to erosion than if the diameter is large. Therefore, a particular portion of the motor in the low-section is exposed to a reduced amount of gases in comparison to a particular portion of the motor in the high-section.

Since the three sections of the rocket motors are exposed to different conditions, different insulation materials are desirable to adequately protect the different sections. For example, in a Castor-120 motor, two insulation materials are used. A low-cost, low-density silica-filled EPDM ("SFEPDM") is used in a low-Mach environment (the low-section or cylinder region). An expensive, difficult to handle, high-density KEVLAR® filled EPDM ("KFEPDM") is used in the high-Mach environment (the mid- and high-sections or the aft and forward dome of the motor, respectively) due to its improved ablative characteristics. While using different insulation materials provides the requisite ablative properties, insulation layup using multiple insulation materials is expensive and the use of a high-density rubber-like KFEPDM reduces the payload capacity of the motor.

While conventional insulation materials have good ablative properties, the elements of cost, mechanical properties, and physical properties of these insulation materials are not optimal. Therefore, what is needed in the art is a low-cost, low-density insulation material that has the desired mechanical and physical properties. Preferably, a polymeric, organic filler is used in an insulation material for use in rocket motors to achieve these properties.

BRIEF SUMMARY OF THE INVENTION

The present invention relates to an insulation material that is used in a rocket motor. The insulation material comprises a low-density EPDM polymer, at least one flame-retardant, and an organic filler that also functions as a flame-retardant. The organic filler is currently preferred to be a polymeric, organic filler such as polyvinyl chloride.

A rocket motor comprising an insulation material is also disclosed. The insulation material comprises a low-density EPDM polymer, at least one flame-retardant, and a polymeric, organic filler. The insulation material is applied between an inner surface of a case of the rocket motor and a propellant.

The present invention also relates to a method of insulating a rocket motor. The method comprises producing an insulation material that comprises a low-density EPDM polymer, at least one flame-retardant, and a polymeric, organic filler. The insulation material is applied to an inner surface of a case of the rocket motor. The insulation material is subsequently cured to form an insulating layer on the rocket motor.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1B:
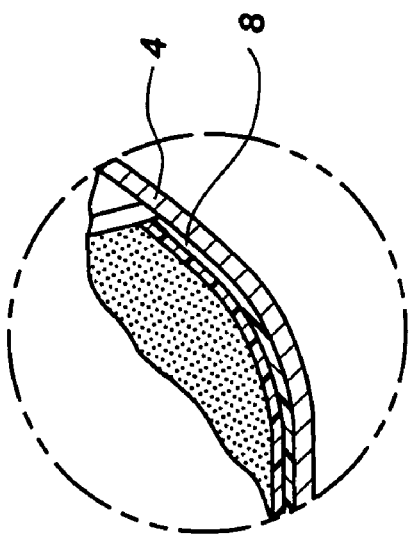
FIGS. 1A and 1B are schematic illustrations of a conventional rocket motor.

The insulation material of the present invention may be used as an insulation layer 8 in a rocket motor 2. The insulation material may comprise an EPDM polymer, at least one flame-retardant, and a polymeric, organic filler. The EPDM polymer of the insulation material may be a low-density, EPDM polymer and may be present in a range of from approximately 35-90 wt % of the total weight of the insulation material. It is currently preferred that the EPDM polymer be present at approximately 45-75 wt %. It is also contemplated that more than one low-density, EPDM polymer may be used. The low-density, EPDM polymer may be a combination of NORDEL IP® 4640, available from Dupont Dow Elastomers (Wilmington, Del.), and KELTAN® 1446A, available from DSM Elastomers (Heerlen, the Netherlands). Other combinations of low-density EPDM polymers may also be used within the scope of the present invention.

The at least one flame-retardant may be an inorganic or organic flame-retardant, as known in the art. In addition, a combination of two or more flame-retardants, such as at least one inorganic and at least one organic flame-retardant, may be used. For example, PHOS-CHECK® P-30, an inorganic flame-retardant available from Monsanto (St. Louis, Mo.), may be used in combination with the inorganic flame-retardants HI-SIL® 532 EP and HI-SIL® 233, both of which are available from PPG Industries, Inc. (Pittsburgh, Pa.).

The organic filler may be used to prevent or slow down the decomposition of the insulation material. The organic filler may be polymeric and may be present at a range of from approximately 3-30 wt %. The organic filler may include, but is not limited to, polyvinylchloride ("PVC"), polyphenylene sulfide, melamine, or a homopolymer of vinylidene chloride. The organic filler may be a polymeric, halogenated hydrocarbon. The physical form of the organic filler may be a fiber form, a powder form, or any form in which the organic filler is produced. Preferably, the organic filler is PVC, which is a chlorinated, noncyclic polymer that has one chlorine atom per repeat unit. The PVC may be a fiber, such as RHOVYL® ZCS fibers available from Rhovyl S.A. (Neuilly-sur-Seine, France). The RHOVYL® ZCS fibers have a density of 1.38 g/cc and a length of approximately 60 mm. The PVC may also be a powder, such as OXYVINYLS™ 500F, which is available from OxyVinyls, LP (Dallas, Tex.).

While halogenated compounds are known in the art as flame-retardants, the commonly used halogenated compounds are small molecules, such as the DECHLORANE® compounds. However, the desirable mechanical properties of the insulation material worsen when small molecules are used. In contrast, PVC is polymeric and, therefore, has less effect on the rubber properties than the small molecule flame-retardants. In addition to PVC, it is also contemplated that other halogenated polymers may be used as the organic filler. Specifically, polymers with a higher halogen content may be used. These polymers may either have a higher percentage of halogen than PVC or may have more than one halogen atom per repeat unit.

Without being tied to a single theory, it is believed by the inventor that PVC acts as a flame-retardant in synergism with other flame-retardants in the insulation material. Under combustion conditions, PVC decomposes and releases chlorine and chlorine-containing compounds, such as hydrochloric acid. Hydrochloric acid is a good char promoter and forms a char layer on the rubber, thereby protecting it from ablation. While the examples discussed below only refer to chlorine-containing polymers, such as PVC, it is also contemplated that other halogenated polymers that release halogen-containing compounds will have the same effect on the ablation of the insulation material. Halogen-containing compounds are known to be good char promoters and to have flame-retarding properties. For example, fluorinated polymers that release hydrofluoric acid will have the same effect.

The insulation material may comprise optional components, such as antioxidants, cure accelerators, cure activators, and tackifiers or plasticizers. The antioxidants may include AGERITE® Stalite S and AGERITE® HP-S, available from R. T. Vanderbilt Chemical Company (Norwalk, Conn.). The tackifiers may include AKROCHEM® P-133, available from Akrochem Chemical Corp. (Akron, Ohio), and WING-TACK® 95, available from Goodyear Chemical (Akron, Ohio). The cure accelerators may include butyl zimate and compounds from the ALTAX® and SULFAD® series of cure accelerators, which are all available from R. T. Vanderbilt Co., Inc. (Norwalk, Conn.). The cure activators may include ELASTOMAG® 170, which is available from Rohm & Haas Co. (Andover, Mass.), and KADOX® 920C Zinc Oxide, which is available from Zinc Corp. of America (Monaca, Pa.).

The insulation material may be prepared by various techniques known in the art, such as by using an internal mixer, a BUSS mixer, or a solvation technique. The technique used to form the insulation material may affect the length of the organic filler fiber that is used in the insulation material because each technique causes a varying amount of damage to the fibers. If the insulation material is prepared in the internal mixer, an insulation lay-up technique is not critical, which is in contrast to other fiber-filled formulations. In addition, due to the good rheological properties of this insulation material (long scorch time and slow cure rate), cold storage of these materials may not be essential, in contrast to currently used SFEPDM. These factors significantly reduce the manufacturing and processing costs of the insulation material and resulting rocket motor, in addition to helping increase the payload of the rocket motor.

Figure 1A:
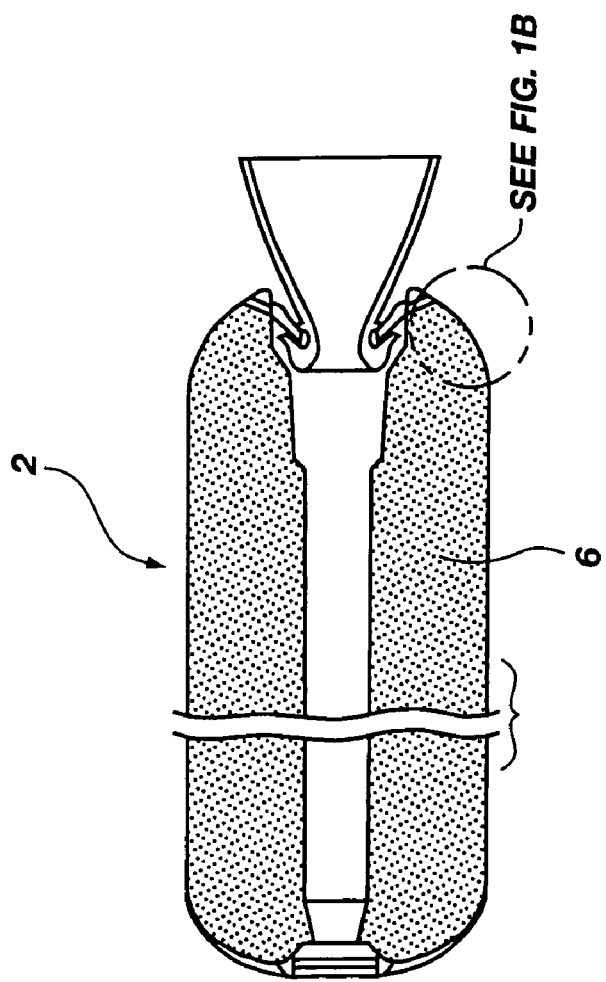

The insulation material may be deposited or applied between the case 4 and the propellant grain 6. Specifically, the insulation material may be deposited or applied on an inner surface of the case 4 of the rocket motor 2, as shown in FIGS. 1A and 1B. Preferably, the insulation material is applied in an uncured form and then cured to form the insulation layer 8. For example, uncured insulation material may be applied to the inside of a formed rocket motor and then cured. In addition, the uncured insulation material may be applied to a mandrel, cured to form the insulation layer 8, and subsequent layers of the rocket motor formed over the insulation layer 8. The insulation material may be cured in a press at approximately 300±10° F. for approximately two hours at approximately 100±10 psi. The insulation material may also be cured in an autoclave at approximately 300±10° F. at a pressure of approximately 45 psi. The time required to cure the insulation material may depend on the thickness of the insulation material.

A method of insulating a rocket motor is also described. The method comprises producing an insulation material that comprises an EPDM polymer, at least one flame-retardant, and a polymeric, organic filler. Uncured insulation material is deposited on, or applied to, an inner surface of a case 4 of a rocket motor 2. The insulation material is subsequently cured to form an insulation layer 8 that comprises the insulation material.

In addition to being used in rocket motors, the insulation material may be used in other articles where protection from heat and gases is necessary. For example, the insulation material may be used for heat and gas protection in under-the-hood applications in automobiles. The insulation material may also be used in conveyor belts and in noise-damping applications in automobile and other fields. In addition, since the insulation material may be extruded, compression molded, or calendered, the insulation material may be used in routine rubber applications including, but not limited to, such applications as hoses, gaskets, seals, isolators and mounts, cushions, air emission hoses, and dock fenders.

EXAMPLE 1

Compositions of PVC Insulation Materials

Numerous PVC insulation materials comprising different fiber lengths and different forms of PVC were prepared. One insulation material, RDL5815, was prepared in an internal mixer using conventional rubber compounding techniques, as known in the art. The composition of RDL5815 is shown in Table 1.

TABLE 1

Composition of RDL5815

| Component | Parts by weight |
| --- | --- |
| NORDEL ® IP 4640 | 70.00 |
| KELTAN ® 1446A | 38.00 |
| N-330 ® Carbon Black | 1.00 |
| AGERITE ® Stalite S | 1.50 |
| AGERITE ® HP-S | 0.30 |
| AKROCHEM ® P-133 | 2.00 |
| WINGTACK ® 95 | 2.00 |
| PHOS-CHECK ® P-30 | 2.00 |
| HI-SIL ® 532 EP | 17.50 |
| HI-SIL ® 233 | 17.50 |
| KADOX ® 920C Zinc Oxide | 4.00 |
| ELASTOMAG ® 170 | 0.60 |
| ALTAX ® | 1.10 |
| SULFAD ® | 0.22 |
| Butyl Zimate | 2.20 |
| Sulfur | 0.55 |
| RHOVYL ® ZCS Fibers | 25.00 |

Compositions of insulation materials having RHOVYL® ZCS fibers of differing lengths were also prepared. These insulation materials are referred to as RDL5841 and RDL5844. RDL5841 and RDL5844 comprised the same components as listed in Table 1 for RDL5815. The different lengths of fibers in these insulation materials were achieved using different mixing techniques.

In addition, an insulation material comprising a powdered form of PVC was prepared. This insulation material, RDL5840, utilized 10% OXYVINYLS™ 500F powder instead of RHOVYL® ZCS fibers.

An insulation material comprising carbon fibers in addition to the PVC fibers was also prepared. In RDL5837, 10% FORTAFIL® 144, available from Akzo Nobel (Knoxville, Tenn.), was added to the components of RDL5815.

EXAMPLE 2

Preparation of the PVC Insulation Materials

Figure 2:
FIGS. 2 and 3 show optical microscopy and scanning electron microscopy of an insulation material of the present invention.
Figure 3:
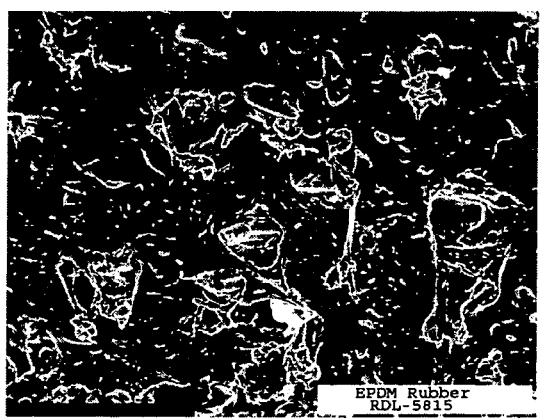
Figure 3:
Figure 4:
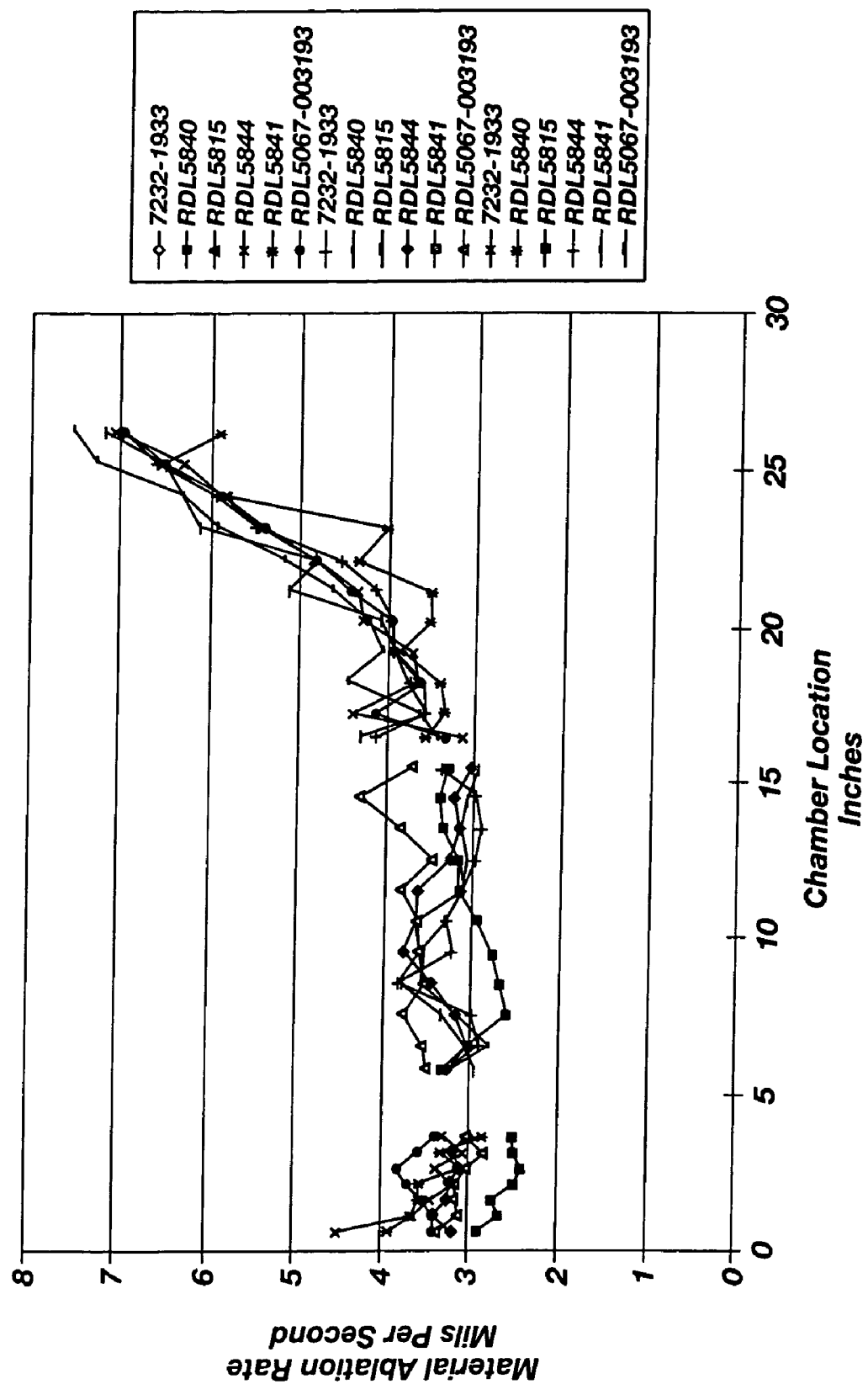
FIGS. 4-7 show ablative performance characteristics of insulation materials of the present invention in a low-mach char motor.
Figure 5:
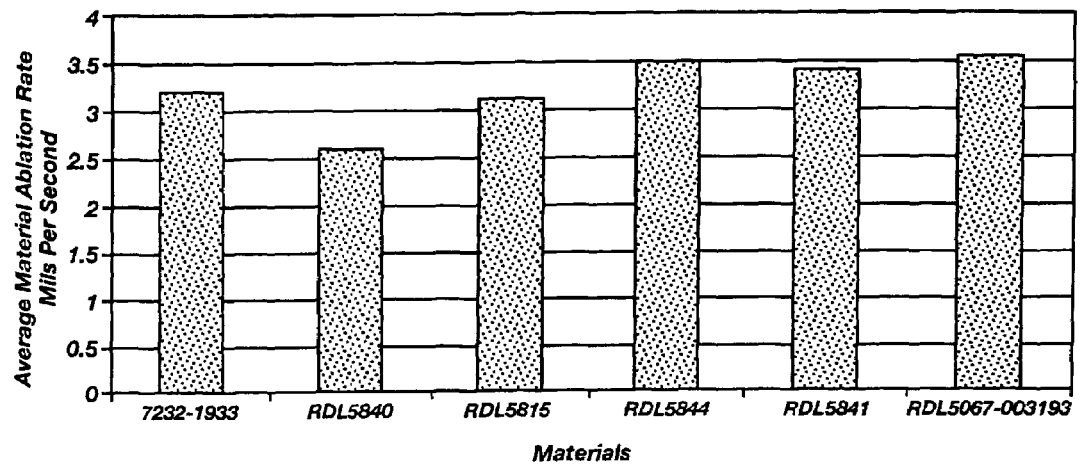
Figure 6:
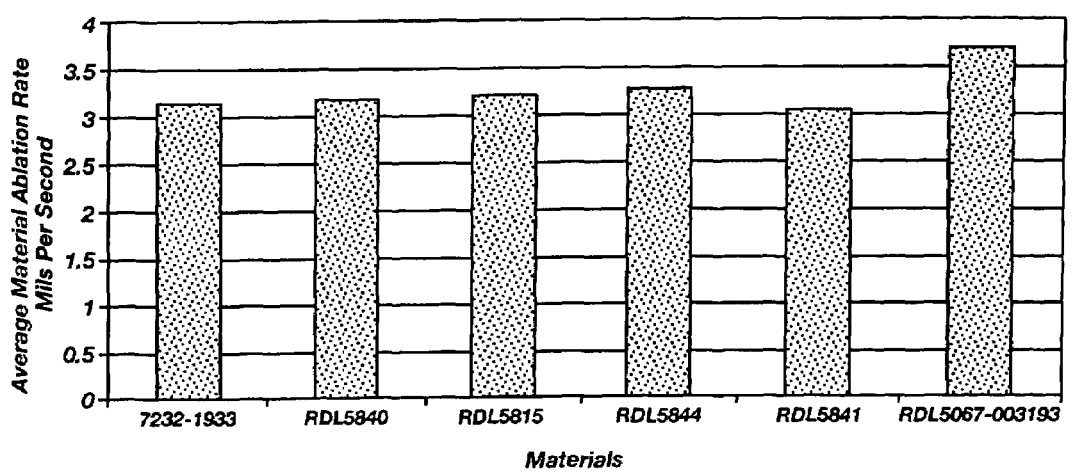
Figure 7:
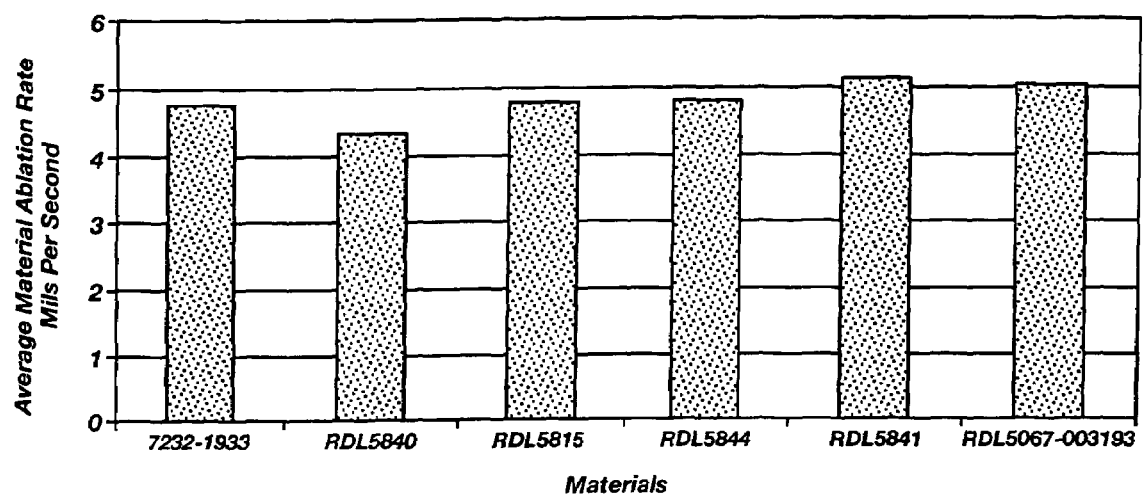

To achieve PVC fibers of different lengths, the components listed in Table 1 were mixed by various techniques to prepare RDL5815, RDL5841, and RDL5844. The components of these three insulation materials were identical. Only the method of PVC incorporation differed. RDL5815 was prepared using 60 mm long RHOVYL® ZCS fibers in an internal mixer using a conventional mixing technique. The internal mixer exerted a high shear force on the RHOVYL® ZCS fibers and, therefore, damage to the RHOVYL® ZCS fibers was great. Optical microscopy and scanning electron microscopy of RDL5815 indicated that the RHOVYL® ZCS fibers were significantly damaged during processing in the internal mixer, as shown in FIGS. 2 and 3. The RHOVYL® ZCS fibers were reduced from a length of 60 mm to approximately several hundred μm by the end of the processing.

RDL5841 was prepared by a solvation method, as known in the art. The solvation method exerted a low shear force on the RHOVYL® ZCS fibers and, therefore, damage to the PVC fibers was minimized. However, due to the long length of the RHOVYL® ZCS fibers, the solvation method was difficult because the fibers coiled up on the rotor of the mixer, thereby making stirring difficult. The length of the fibers in RDL5841 was approximately the starting length of the RHOVYL® ZCS fibers. RDL5844 was prepared by incorporating the RHOVYL® ZCS fibers using a BUSS mixer, which exerted an intermediate shear force on the RHOVYL® ZCS fibers.

In these three PVC insulation materials, RDL5815 had the shortest fiber length, RDL5841 had the longest fiber length, and RDL5844 had an intermediate fiber length.

RDL5837 was prepared by a solvation technique, as known in the art.

RDL5840 was prepared by an internal mixer using a conventional mixing technique.

EXAMPLE 3

Rheological and Physical Properties of the PVC Insulation Materials

The rheological and physical properties of the PVC insulation materials described in Examples 1 and 2 are shown in Tables 2 and 3. The properties of RDL5815, RDL5840, RDL5841, and RDL5844 were compared to the properties of insulation materials that are currently produced and used. The current insulation materials included an asbestos-filled nitrile butadiene rubber ("ASNBR") composition, a silica-filled EPDM ("SFEPDM") composition, a carbon-filled EPDM ("CFEPDM"), and a KEVLAR® filled EPDM ("KFEPDM") composition.

TABLE 2

Rheological Properties of the PVC Insulation Materials in Comparison to Current Production Insulation Materials.

| Rubber | Physical Form | % (By Weight) | Mooney Viscosity (212° F.) | Mooney Scorch (250° F.) | TS2 (300° F.) | TC90 (300° F.) |
|---|---|---|---|---|---|---|
| RDL5815 | PVC Fiber | 13.48 | 67-71 | 38-39 | 5.2-5.7 | 58-62 |
| RDL5840 | PVC Powder | 13.48 | 77 | 38.6 | 5.6-5.7 | 47-51 |
| RDL5841 | PVC Fiber | 13.48 | — | 35.7 | 5.4 | 55 |
| RDL5844 | PVC Fiber | 18.78 | 79-95 | 31-35 | 4.9 | 51-53 |

TABLE 3

Physical Properties of the PVC Insulation Materials in Comparison to Current Production Insulation Materials.

| Rubber | Physical Form | % (By weight) | Density (g/cc) | Hardness (Shore A) |
|---|---|---|---|---|
| RDL5815 | PVC Fiber | 13.48 | 1.081 | 66.2 |
| RDL5840 | PVC Powder | 13.48 | 1.080 | 68.8 |
| RDL5841 | PVC Fiber | 13.48 | — | — |
| RDL5844 | PVC Fiber | 18.78 | 1.078 | 73.6 |

RDL5815 had a long scorch time and slow cure rate in comparison to the currently produced insulation materials. Since RDL5815 is slow curing, it provides a significantly larger processing window in comparison to the currently produced insulation materials. RDL5815 also has a significantly lower density than ASNBR and KFEPDM and a slightly lower density than SFEPDM. However, although SFEPDM has only a slightly higher density than RDL5815, SFEPDM is not suitable for use in all sections of the rocket motors, particularly in areas that experience high erosion.

RDL5841, which had a longer fiber length, exhibited a reduced scorch time and slightly reduced TC90 value in comparison to RDL5815. RDL5840, which comprised PVC in powder form, did not have any effect on scorch time but had an increased Mooney viscosity and slightly reduced TC90 value in comparison to RDL5815. In addition, as expected, RDL5840 had approximately the same density as RDL5815.

EXAMPLE 4

Mechanical Properties of the PVC Insulation Materials

Table 4 illustrates the mechanical properties of RDL5815, RDL5840, and RDL5844.

TABLE 4

Mechanical Properties of the PVC Insulation Materials in Comparison to ASNBR, SFEPDM, and KFEPDM Compositions.

| Formulation | Physical Form | Tear Strength (PSI) | Tensile Strength // (PSI) | Tensile Strength ⊥ (PSI) | Elongation // % | Elongation ⊥ % | Hardness Shore A |
|---|---|---|---|---|---|---|---|
| RDL5815 | PVC Fiber | 211 | 1630-1690 | 1520-1660 | 592-638 | 602-635 | 66.2 |
| RDL5840 | PVC Powder | 219 | 2000 | | 613 | | 68.8 |
| RDL5844 | PVC Fiber | 211 | 765 | 627 | 386 | 365 | 73.6 |

RDL5815 had significantly improved mechanical properties in comparison to the currently produced insulation materials. In addition, RDL5840, which comprised PVC powder instead of PVC fibers, also exhibited improved mechanical properties in comparison to the currently produced insulation materials. RDL5840 also had slightly better tensile strength than RDL5815. The tensile elongation for both RDL5815 and RDL5840 was approximately 600%. The improvement in mechanical properties was a function of the PVC fiber length. As the fiber length increased, as in RDL5844, the tensile strength and the tensile elongation decreased to approximately half of that exhibited by RDL5815. However, even with this reduction and introduction of anisotropy, RDL5844 had significantly better elongation than the currently produced insulation materials.

In summary, the PVC insulation materials exhibited low-density and better mechanical properties than the fiber-filled insulation materials currently in production. In addition, the mechanical properties of the PVC insulation materials are improved by decreasing the PVC fiber length.

EXAMPLE 5

Ablative Performance of the PVC Insulation Materials

To determine whether the fiber length had an effect on the ablative performance of the PVC insulation materials, a low-mach char motor was fired using RDL5815, RDL5840, RDL5841, RDL5844, and the current production insulation materials ASNBR (7232) and KFEPDM (RDL5067). As shown in FIGS. 4-7, RDL5815 and RDL5840 exhibited improved or at least comparable ablative performance in comparison to the ASNBR and KFEPDM insulation materials. RDL5815, which is almost 15% lighter than the KFEPDM insulation material, performed better than the KFEPDM in all three sections of the motor. The results also indicated that RDL5815 performed similar to ASNBR in all three sections of the motor.

The length of PVC fiber did not significantly affect the ablative performance of the RDL5815, RDL5841, and RDL5844 compositions. All of these insulation materials exhibited improved or at least comparable ablative performance in comparison to the KFEPDM insulation material. In addition, when PVC was used in powdered form, as in RDL5840, the insulation material exhibited a slight improvement in all three sections of the low-Mach char motor in comparison to RDL5815. RDL5840 also exhibited about 25% better material ablation rate performance than RDL5067 and about 15% better material ablation rate performance than 7232 in the low section of the low-Mach char motor.

The PVC insulation materials performed similar to and slightly better than RDL5067 in all three sections of a low-Mach char motor. The four PVC insulation materials performed equally well. The fiber length had no positive effect on the ablative performance in the Mach number range observed by the low-Mach char motor. Out of the PVC insulation materials, RDL5840 had slightly better ablative properties than RDL5815, which may be due to intimate mixing that is achieved when the PVC is in powder form.

Figure 8:
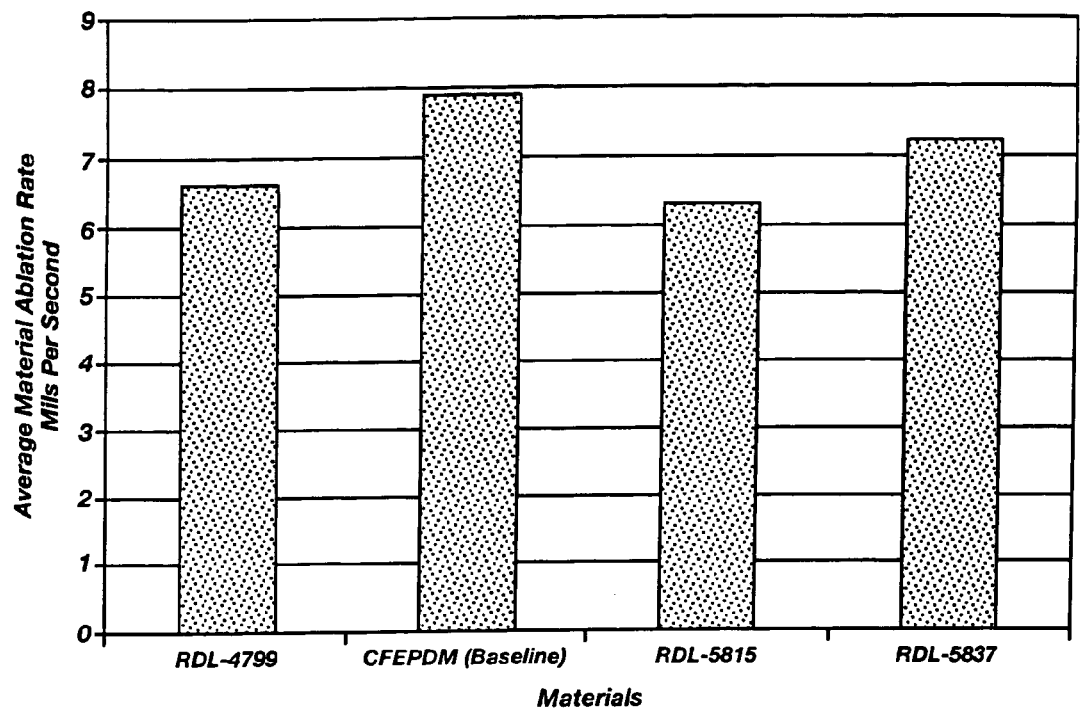
FIGS. 8-9 show material ablative rates ("MAR") of insulation materials of the present invention.
Figure 9:
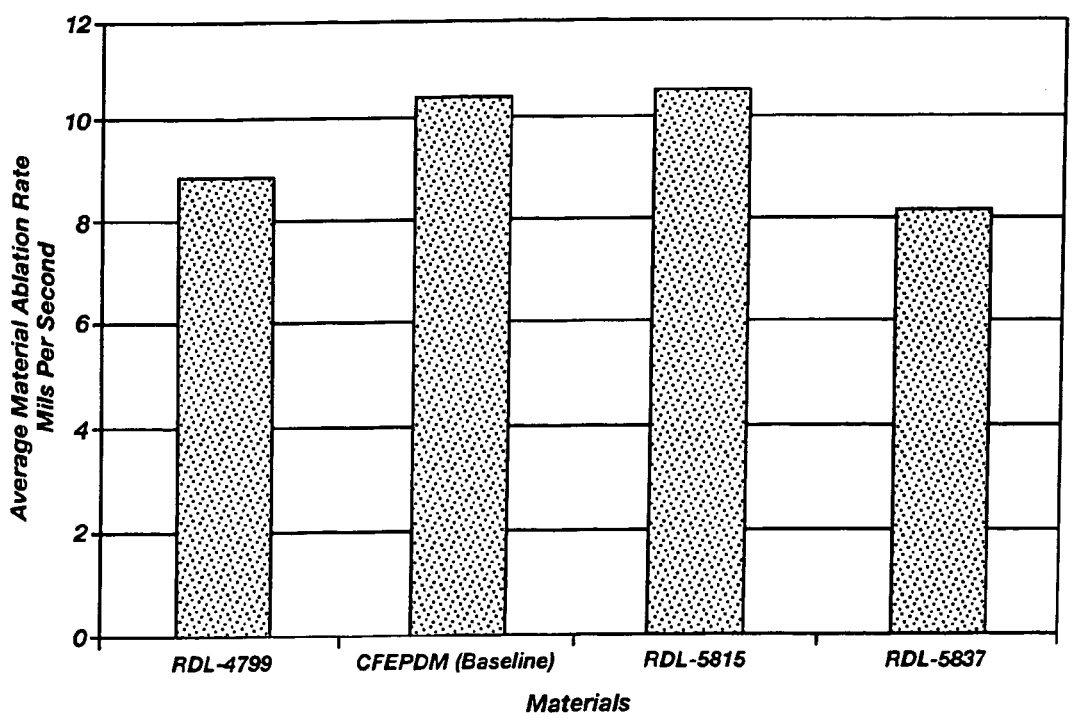

Ablative performance of RDL5815 in the mid-Mach seventy pound char motor indicated that this composition performed better in the low- and mid-section of the mid-Mach char motor than RDL4799, which is another KFEPDM composition similar to RDL5067. The ablative performance of the insulation materials in the mid-section of the mid-Mach char motor is shown in FIG. 8. However, performance of RDL5815 in the high section of the mid-Mach char motor was inferior to RDL4799 and CFEPDM, as shown in FIG. 9. RDL5837, which had carbon fibers in addition to the PVC fibers, exhibited improved performance in the high section of the mid-Mach seventy pound char motor in comparison to RDL4799 and CFEPDM.

Based on the rheological, mechanical, and physical properties of the insulating material and the ablative results of the insulation material, it is preferable that the polymeric PVC (fibers or powder) is incorporated into the insulation material using an internal mixer to obtain optimum properties.

EXAMPLE 6

RDL5815 Use in the Castor 120 Motor

A single formulation of RDL5815 insulation material is used in a whole Castor 120 motor. Uncured RDL5815 insulation material is deposited or applied on an inner surface of the case of the rocket motor. The uncured RDL5815 insulation material is applied and then cured to form the insulation layer or is applied to a mandrel, cured to form the insulation layer, and then subsequent layers of the rocket motor are formed over the insulation layer. The insulation material is cured in a press at approximately 300±10° F. for approximately two hours at approximately 100±10 psi. Alternatively, the insulation material is cured in an autoclave at approximately 300±10° F. at a pressure of approximately 45 psi.

In addition to providing the desired rheological, mechanical, and ablative properties, using the RDL5815 insulation material on the inner surface of the rocket motor also results in a reduction of the insulation weights.

EXAMPLE 7

Figure 10:
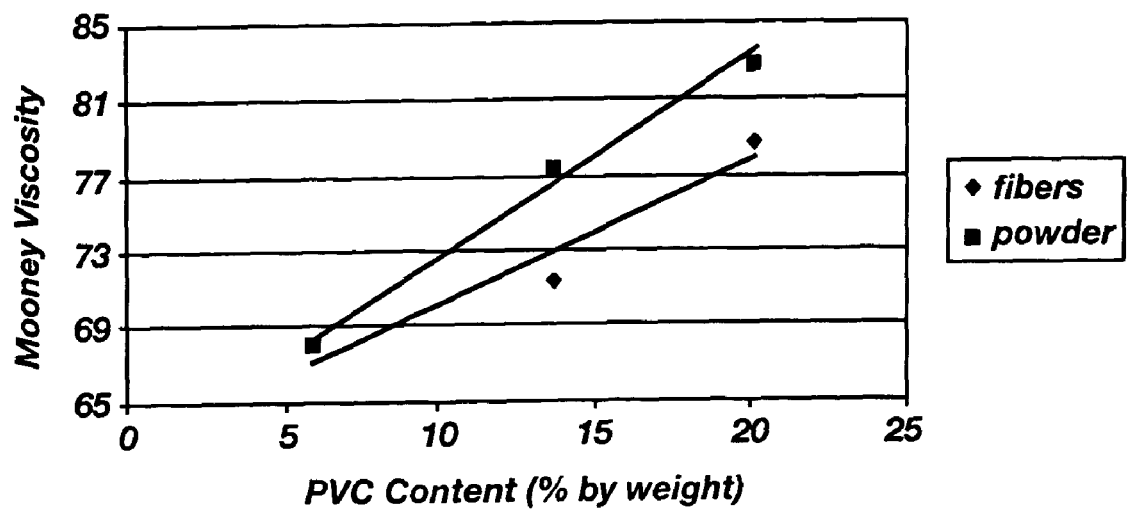
FIGS. 10-12 show the effect of powdered and fibrous polyvinylchloride on the Mooney viscosity and curing rate of the insulation materials of the present invention.
Figure 11:
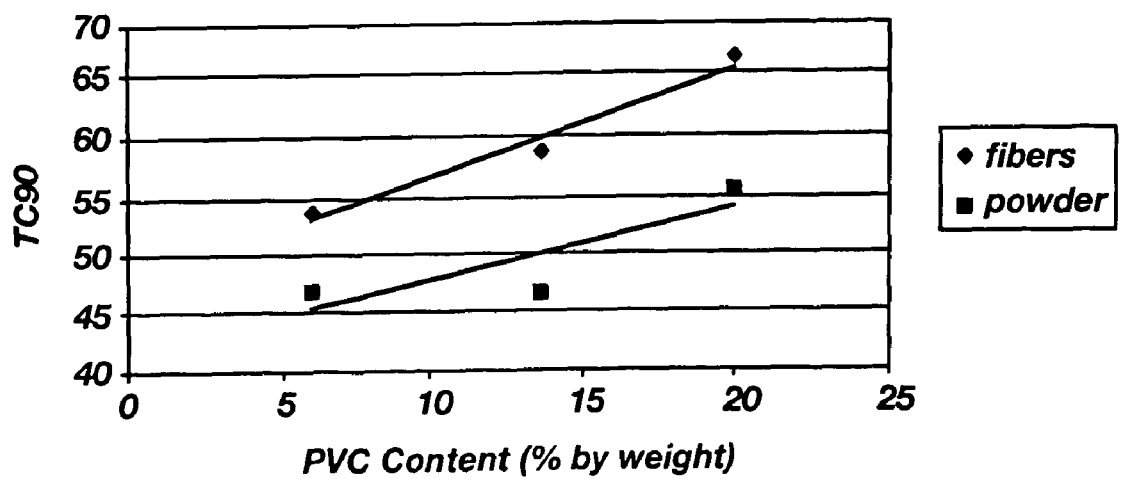
Figure 12:
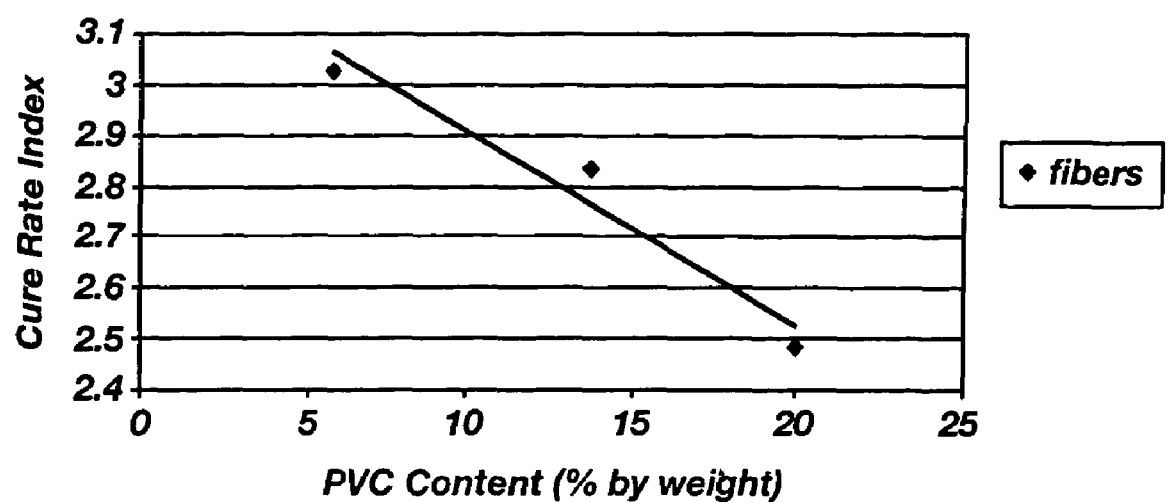

Rheological and Physical Properties of PVC Insulation Materials having Varying Amounts of PVC To determine the effect of the physical form and amount of PVC on the rheological, mechanical, and physical properties of the insulation materials, six PVC insulation materials were prepared. Three of the insulation materials had varying amounts of PVC fibers and the remaining three insulation materials had varying amounts of powdered PVC. The rheological and physical properties of these formulations are shown in Tables 5 and 6.

the fiber form, as shown in FIG. 10. The TC90 values obtained by Oscillating Disc Rheometer ("ODR") indicated that as the PVC content increased, the TC90 value increased, which indicated that PVC slows down the curing reaction. The data in FIG. 11 indicated that the PVC fibers reduced the rate of curing reaction to a greater extent than PVC in the powder form. FIG. 12 showed the same trend, as determined by Rubber Processing Analyzer ("RPA"). As the PVC content increased, the cure rate index decreased. In addition, the data indicated that PVC in the fiber form decreased the cure rate more than PVC in the powder form. As shown in Table 6, the density and hardness of the insulation material increased as the PVC content increased.

EXAMPLE 8

Mechanical Properties of PVC Insulation Materials Having Varying Amounts of PVC The mechanical properties of the PVC insulation materials described in Example 7, which comprise varying amounts of PVC, are shown in Table 7.

TABLE 5

Rheological Properties of PVC Insulation Materials with Varying PVC Content

| Rubber | PVC Content (% by wt) | Physical Form | Mooney Viscosity (212° F.) | Mooney Scorch (250° F.) | TS2 (ODR) (300° F.) | TC90 (ODR) (300° F.) | Cure Rate Index (RPA) |
|---|---|---|---|---|---|---|---|
| RDL5859 | 5.9 | Fiber | 67.6 | 41.0 | 5.61 | 53.68 | 3.022 |
| RDL5815 | 13.5 | Fiber | 71.2 | 38.8 | 5.55 | 58.58 | 2.826 |
| RDL5860 | 20 | Fiber | 78.6 | 37.1 | 5.67 | 66.15 | 2.495 |
| RDL5862 | 5.9 | Powder | 67.9 | 39.7 | 5.53 | 47.01 | 3.231 |
| RDL5840 | 13.5 | Powder | 77.32 | 38.6 | 5.59 | 46.92 | 2.916 |
| RDL5863 | 20 | Powder | 82.54 | 39.32 | 5.52 | 55.41 | 2.638 |

TABLE 6

Physical Properties of PVC Insulation Materials with Varying PVC Content

| Rubber | PVC Content (% by wt) | Physical Form | Density g/cc | Hardness Shore A | Ash Content % |
|---|---|---|---|---|---|
| RDL5859 | 5.9 | Fiber | 1.0573 | 61.6 | 22.51 |
| RDL5815 | 13.5 | Fiber | 1.0801 | 66.2 | 20.62 |
| RDL5860 | 20 | Fiber | 1.1013 | 71.6 | 19.07 |
| RDL5862 | 5.9 | Powder | 1.0568 | 63.6 | 22.41 |
| RDL5840 | 13.5 | Powder | 1.0796 | 67.0 | — |
| RDL5863 | 20 | Powder | 1.0942 | 73.2 | 18.96 |

As shown in Table 5, the Mooney viscosity increased as the PVC content increased. However, this increase was slightly more for PVC insulation materials in the powder form than in

TABLE 7

Mechanical Properties of PVC Insulation Materials with Varying PVC Content

| Rubber | PVC Content (% by wt) | Physical Form | Tensile Strength (psi) ∥ | Tensile Strength (psi) ⊥ | Elongation (%) ∥ | Elongation (%) ⊥ | Tear Strength (psi) |
|---|---|---|---|---|---|---|---|
| RDL5859 | 5.9 | Fiber | 1920 | 2060 | 605 | 628 | 205 |
| RDL5815 | 13.5 | Fiber | 1690 | 1660 | 592 | 602 | 211 |
| RDL5860 | 20 | Fiber | 1280 | 1200 | 582 | 593 | 206 |
| RDL5862 | 5.9 | Powder | 2380 | | 645 | | 197 |
| RDL5840 | 13.5 | Powder | 2000 | | 613 | | 219 |
| RDL5863 | 20 | Powder | 1480 | | 578 | | 216 |

The tensile strength, elongation, and tear strength of these insulation materials are significantly high. For fiber-filled insulations, the highest value for tensile strength was observed for RDL5859, which was the lowest tested amount of PVC. These insulation materials showed a very small amount of anisotropy with values in parallel and perpendicular directions differing by a small amount, which indicates that during internal mixing, fibers were dispersed randomly in the EPDM. The fiber PVC insulation materials had slightly inferior mechanical properties than the powdered PVC insulation materials.

EXAMPLE 9

PVC Insulation Materials having Varying Amounts of Flame-Retardants

In order to optimize the insulation materials and reduce the number of components, two additional insulation materials were prepared and tested. In RDL5874 and RDL5875, the amounts of AGERITE® Stalite S, AGERITE® HP-S, HI-SIL® 532 EP, and HI-SIL® 233 were adjusted while keeping the amount of RHOVYL® ZCS fibers constant.

TABLE 8

Components of Insulation Materials Used to Optimize PVC Insulation Materials

| Components | RDL5815 Parts | RDL5874 Parts | RDL5875 Parts |
|---|---|---|---|
| NORDEL ® IP 4640 | 70.00 | 70.00 | 70.00 |
| KELTAN ® 1446A | 38.00 | 38.00 | 38.00 |
| N-330 ® Carbon black | 1.00 | 1.00 | 1.00 |
| AGERITE ® Stalite S | 1.50 | 1.80 | 1.80 |
| AGERITE ® HP-S | 0.30 | — | — |
| AKROCHEM ® P-133 | 2.00 | 2.00 | 2.00 |
| WINGTACK ® 95 | 2.00 | 2.00 | 2.00 |
| PHOS-CHECK ® P-30 | 2.00 | 2.00 | 7.00 |
| HI-SIL ® 532 EP | 17.50 | — | — |
| HI-SIL ® 233 | 17.50 | 30.00 | 30.00 |
| KADOX ® 920C Zinc Oxide | 4.00 | 4.00 | 4.00 |
| ELASTOMAG ® 170 | 0.60 | 0.60 | 0.60 |
| ALTAX ® | 1.10 | 1.10 | 1.10 |
| SULFADS ® | 0.22 | 0.22 | 0.22 |
| Butyl Zimate | 2.20 | 2.20 | 2.20 |
| Sulfur | 0.55 | 0.55 | 0.55 |
| RHOVYL ZCS Fibers | 25.00 | 25.00 | 25.00 |

The rheological, physical, and mechanical properties of these insulation materials compared to RDL5815 are shown in Tables 9-11.

TABLE 9

Rheological Properties of PVC Insulation Materials Prepared for Optimization of Flame-Retardants

| | PVC | | Mooney | Mooney | TS2 | TC90 | Cure |
|---|---|---|---|---|---|---|---|
| Rubber | Content (% by wt) | Physical Form | Viscosity (212° F.) | Scorch (250° F.) | (ODR) (300° F.) | (ODR) (300° F.) | Rate Index (RPA) |
| RDL5815 | 13.5 | Fiber | 71.2 | 38.8 | 5.55 | 58.58 | 2.826 |
| RDL5874 | 13.85 | Fiber | 71.4 | 34.4 | 4.76 | 55.05 | 2.705 |
| RDL5875 | 13.5 | Fiber | 69.0 | 34.5 | 4.73 | 45.71 | 2.757 |

TABLE 10

Physical Properties of PVC Insulation Materials Prepared for Optimization of Flame-Retardants

| | PVC | | | |
|---|---|---|---|---|
| Rubber | Content (% by wt) | Physical Form | Density g/cc | Hardness Shore A |
| RDL5815 | 13.5 | Fiber | 1.0801 | 66.2 |
| RDL5874 | 13.85 | Fiber | 1.0710 | 70.0 |
| RDL5875 | 13.5 | Fiber | 1.0816 | 68.0 |

TABLE 11

Mechanical Properties of PVC Insulation Materials Prepared for Optimization of Flame-Retardants

| | PVC | | Tensile Strength (psi) | | Elongation (%) | | Tear Strength |
|---|---|---|---|---|---|---|---|
| Rubber | Content (% by wt) | Physical Form | ∥ | ⊥ | ∥ | ⊥ | (psi) |
| RDL5815 | 13.5 | Fiber | 1690 | 1660 | 592 | 602 | 211 |
| RDL5874 | 13.85 | Fiber | 1960 | 1750 | 624 | 619 | 206 |
| RDL5875 | 13.5 | Fiber | 1860 | 1710 | 643 | 627 | 206 |

By adjusting the amounts of AGERITE® Stalite S, AGERITE® HP-S, HI-SIL® 532 EP, and HI-SIL® 233 in the insulation material, the scorch time was reduced and the formulation cured at a slightly faster rate. By increasing the amount of PHOS-CHECK®, the scorch time was unaffected but the system cured at a faster rate and the Mooney viscosity of the rubber reduced slightly.

The data in Table 9 indicated that by reducing the amount of HI-SIL® in the formulation (from 35 parts per hundred ("phr") to 30 phr), the density of the rubber reduced from 1.08 to 1.07 g/cc. However, at the HI-SIL® content of 30 phr, the density increased to 1.08 g/cc when the PHOS-CHECK® amount was increased from 2 phr to 7 phr. As shown in Table 11, by reducing the amount of HI-SIL® in the formulation from 35 phr (RDL5815) to 30 phr (RDL5874), the tensile strength increased to 1960 and 1750 psi in the parallel and perpendicular directions, respectively. The tear strength decreased slightly to 206 psi from the value of 211 psi for RDL5815. By increasing the amount of PHOS-CHECK® in RDL5874, the tensile strength decreased slightly to 1860 and 1710 psi in the parallel and perpendicular fiber directions, respectively. By increasing the amount of PHOS-CHECK®, the tear strength of the formulation was unaffected and stayed at 206 psi.

EXAMPLE 10

Ablative Performance of PVC Insulation Materials having Varying Amounts of Flame-Retardants To determine the ablative performance of the PVC insulation materials described in Example 9, a low-Mach char motor was fired using six different PVC insulation materials. Five of the six formulations were the PVC insulation materials RDL5859 (5.9% PVC fiber), RDL5815 (13.5% PVC fibers), RDL5860 (20% PVC fibers), RDL5874 (13.5% PVC fibers) and RDL5875 (13.5% PVC fibers). RDL5874 and RDL5875 differed from RDL5815 in the amount of flame-retardant. The sixth formulation, RDL5840, had 13.5% by weight of powdered PVC. The results of this char motor are shown in FIGS. 13-16.

Figure 13:
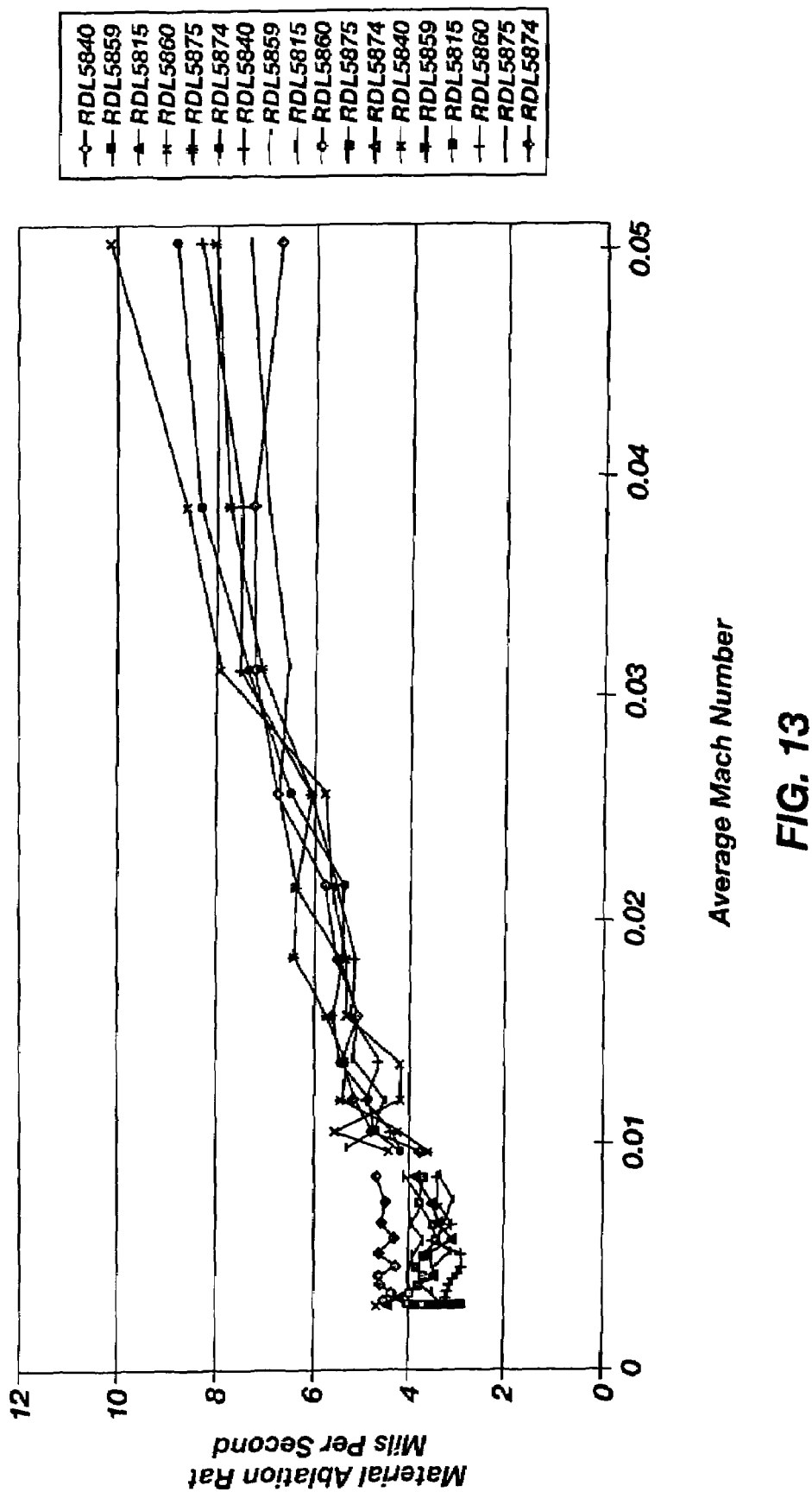
FIGS. 13-16 show ablative performance characteristics of insulation materials of the present invention in a low-mach char motor.
Figure 14:
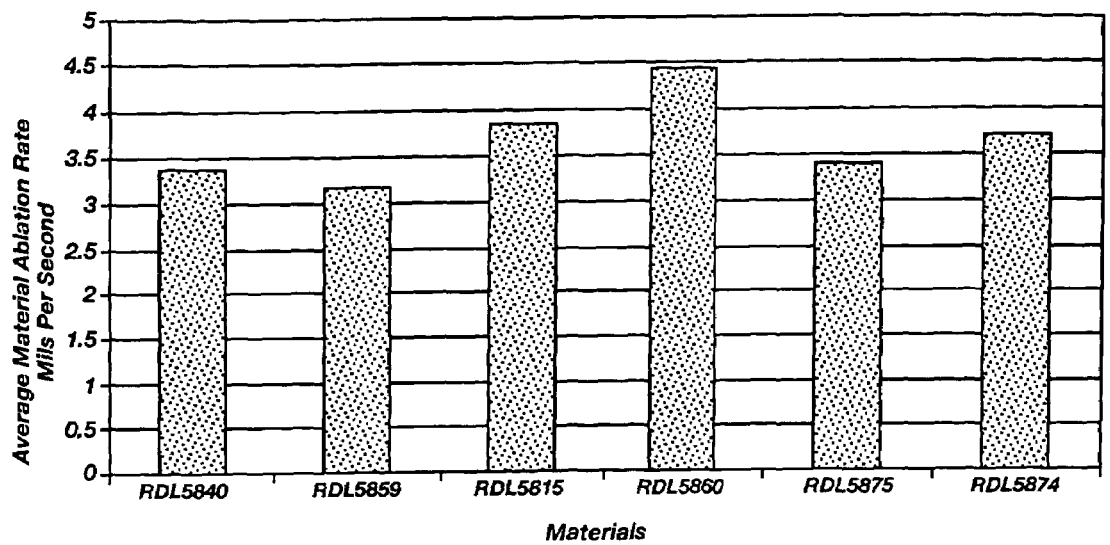
Figure 15:
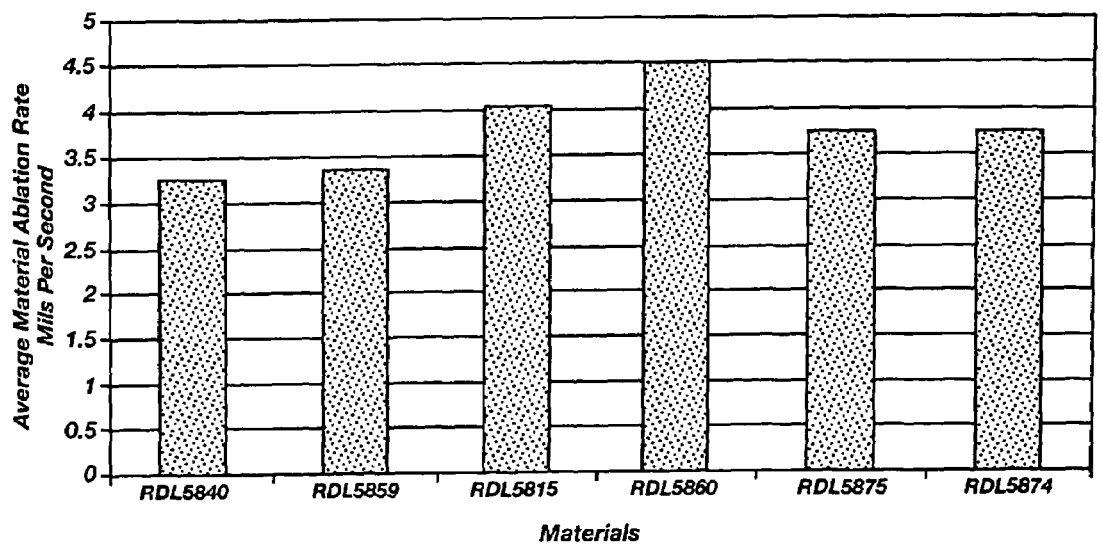
Figure 16:
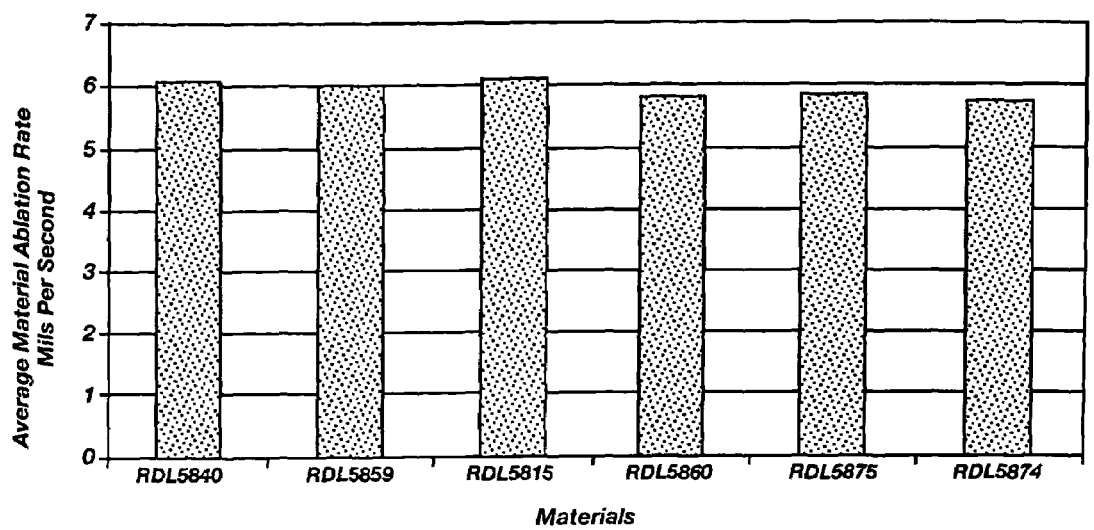

As FIG. 13 indicates, RDL5840 gave good performance up to a Mach number of 0.028. Beyond that Mach number, this formulation performed poorly. RDL5859 provided better performance in the low-Mach motor environment than the insulation materials with higher amounts of PVC fibers. RDL5875, which had a larger amount of PHOS-CHECK® and a smaller amount of HI-SIL®, performed slightly better than RDL5815 and RDL5874, which had a larger amount of HI-SIL® and smaller amount of PHOS-CHECK®. In the high-Mach number region, the fiber-filled PVC insulation material performed better than the powder-filled PVC insulation material.

EXAMPLE 11

Comparison of RDL5815 and RDL5837

Figure 17:
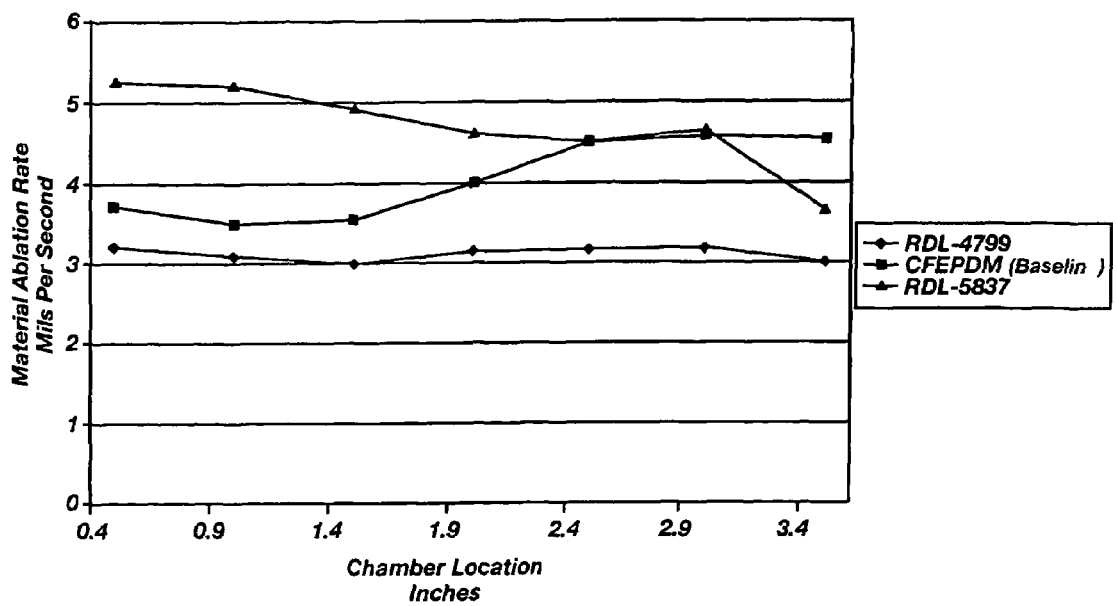
FIGS. 17-19 show ablative performance characteristics of insulation materials of the present invention in a mid-mach motor.
Figure 18:
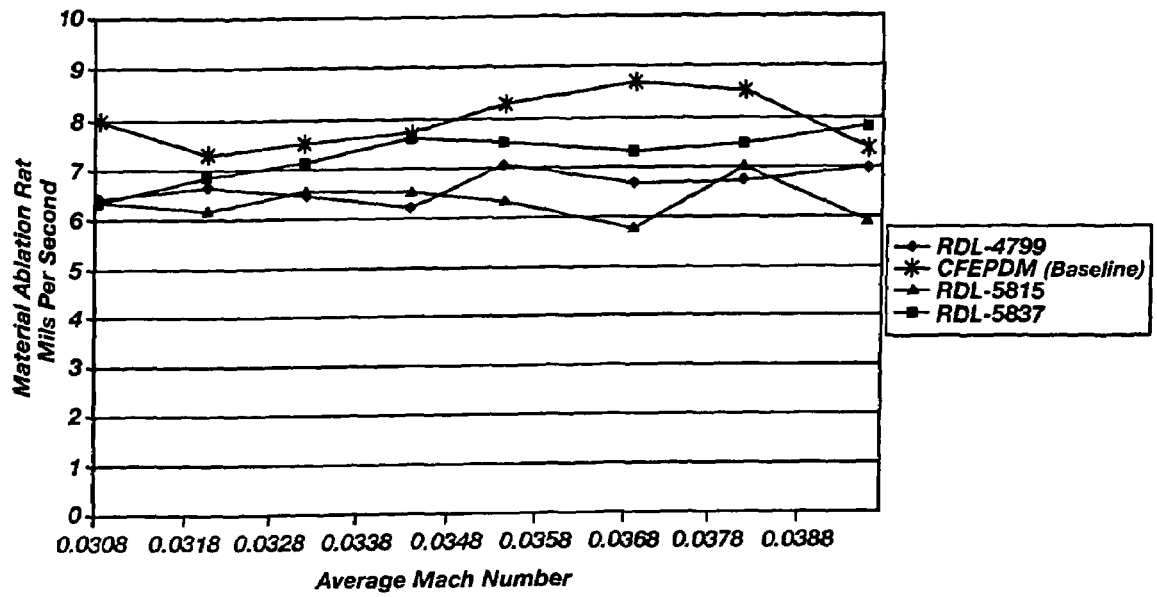
Figure 19:
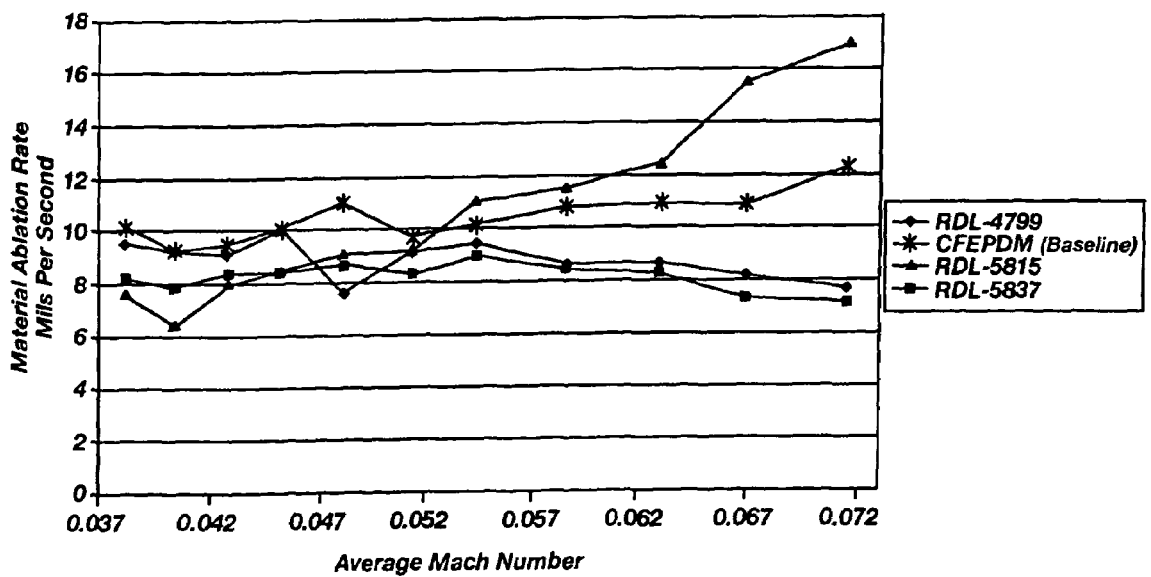

In a char motor test, RDL5815 was slightly inferior to RDL4799 (KFEPDM) above the Mach number of 0.05. Therefore, RDL5837, which comprises PVC fibers and carbon fibers, was prepared to check the ablative characteristics in the high section of a mid-Mach motor and to predict performance in the high-Mach motor. As shown in FIGS. 17-19, RDL5815 had similar performance to RDL4799 and was better than 6850 (baseline CFEPDM) in the mid-section of the mid-Mach motor. In addition, in the high-section, RDL5815 performed similarly to RDL4799 up to the Mach number of 0.05. Beyond that Mach number, RDL5815 showed inferior performance to RDL4799.

Contrary to this behavior, it was observed that in the low-section, RDL5837 performed poorly compared to RDL4799 and 6850. In the mid-section, the performance of RDL5837 was intermediate between RDL4799, RDL5815, and 6850. RDL4799 and RDL5815 showed the best performance in this section. In the high-section, performance of RDL5837 was slightly better than that of RDL4799. RDL5837 showed the best performance in this section.

These results indicated that the ablative performance of RDL5815 was similar to that of RDL4799 up to the Mach number of 0.05. Beyond that Mach number, RDL 5837 performed similarly to RDL4799. In addition, other properties (mechanical, physical and rheological properties) of RDL 5815 were better than properties of currently produced insulation materials.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A rocket motor, comprising:
an insulation material disposed between an inner surface of a case of a rocket motor and a propellant, the insulation material comprising a low-density ethylene propylene diene monomer polymer, at least one flame retardant, sulfur, polyvinyl chloride fibers having a density of 1.38 g/cc, and at least one additive selected from the group consisting of at least one antioxidant, at least one cure accelerator, at least one cure activator, at least one tackifier, and at least one plasticizer.

2. The rocket motor of claim 1, wherein the polyvinyl chloride fibers are dispersed randomly in the insulation material.

3. The rocket motor of claim 1, further comprising carbon fibers.

4. A method of insulating a rocket motor comprising:
producing an insulation material comprising a low-density ethylene propylene diene monomer polymer, at least one flame retardant, sulfur, polyvinylchloride fibers having a density of 1.38 g/cc, and at least one additive selected from the group consisting of at least one antioxidant, at least one cure accelerator, at least one cure activator, at least one tackifier, and at least one plasticizer; and
applying the insulation material to an inner surface of a case of a rocket motor.

5. The method of claim 4, further comprising:
curing the insulation material to form an insulation layer positioned between the inner surface of the case of the rocket motor and a propellant.

* * * * *